United States Patent
Jaynes et al.

(10) Patent No.: US 8,232,236 B2
(45) Date of Patent: Jul. 31, 2012

(54) FAST DRYING AMPHOLYTIC POLYMERS FOR CLEANING COMPOSITIONS

(75) Inventors: Bingham S. Jaynes, New City, NY (US); Ashish Taneja, Ann Arbor, MI (US); Xian-Zhi Zhou, Leonia, NJ (US); Joseph A. Lupia, Monroe, NY (US)

(73) Assignee: BASF SE, Ludwigshafen (DE)

( * ) Notice: Subject to any disclaimer, the term of this patent is extended or adjusted under 35 U.S.C. 154(b) by 59 days.

(21) Appl. No.: 12/726,483

(22) Filed: Mar. 18, 2010

(65) Prior Publication Data

US 2010/0240563 A1 Sep. 23, 2010

Related U.S. Application Data

(60) Provisional application No. 61/210,635, filed on Mar. 20, 2009.

(51) Int. Cl.
 C11D 3/37 (2006.01)
 C08F 36/18 (2006.01)

(52) U.S. Cl. ........ 510/403; 510/180; 510/235; 524/556; 524/597; 524/532; 524/815; 526/307.2; 526/317.1

(58) Field of Classification Search ........... 524/556, 524/597, 532, 815; 526/307.2, 317.1; 510/403, 510/180, 235
See application file for complete search history.

(56) References Cited

U.S. PATENT DOCUMENTS

| | | | |
|---|---|---|---|
| 4,533,708 A * | 8/1985 | Costello | 526/295 |
| 5,981,456 A | 11/1999 | Tartakovsky et al. | |
| 6,554,869 B2 * | 4/2003 | Aubay et al. | 8/137 |
| 6,593,288 B2 | 7/2003 | Aubay et al. | |
| 6,664,218 B1 | 12/2003 | Dastbaz et al. | |
| 6,767,410 B2 | 7/2004 | Aubay et al. | |
| 6,905,814 B1 | 6/2005 | Aubay et al. | |
| 6,924,260 B2 | 8/2005 | Aubay et al. | |
| 7,659,354 B2 * | 2/2010 | Song et al. | 526/307 |
| 2004/0013638 A1 | 1/2004 | Aubay et al. | |
| 2006/0270579 A1 | 11/2006 | Aubay et al. | |
| 2007/0105737 A1 | 5/2007 | Dastbag et al. | |
| 2007/0213251 A1 | 9/2007 | Aubay et al. | |

FOREIGN PATENT DOCUMENTS

| | | |
|---|---|---|
| EP | 0522756 | 1/1993 |
| EP | 835925 | 4/1998 |
| JP | 1997169995 | 1/1999 |
| WO | 9745510 | 12/1997 |
| WO | WO 2004056888 A2 * | 7/2004 |
| WO | 2007068870 | 6/2007 |
| WO | 2007068939 | 6/2007 |

* cited by examiner

*Primary Examiner* — Satya Sastri
(74) *Attorney, Agent, or Firm* — Shiela A. Loggins

(57) ABSTRACT

The claims encompass hard surface cleaner and hard surface treatment compositions containing particular ampholytic polymers which impart not only good residual cleaning properties but in particular give fast drying properties to the cleaning compositions. The polymers are for example terpolymers formed from diallydialkyammonium chloride, anionic monomers and N,N di-$C_1$-$C_8$ alkyl(meth)acrylamides.

18 Claims, No Drawings

FAST DRYING AMPHOLYTIC POLYMERS FOR CLEANING COMPOSITIONS

This application claims the benefit of Provisional Application No. 61/210,635, filed Mar. 20, 2009 herein incorporated entirely by reference.

FIELD OF THE INVENTION

The discussion herein is directed to hard surface cleaner compositions containing particular ampholytic polymers which impart not only good residual cleaning properties but in particular give fast drying properties to the cleaning compositions. The polymers are terpolymers formed from diallydialkyammonium chloride, (meth)acrylic acid and N alkyl substituted acrylamide.

BACKGROUND

Incorporation of various ampholytic polymers in cleaning formulations, in particular hard surface cleaning formulations is well known. Amphoteric polymers, such as copolymers of diallydimethylammonium chloride (DADMAC) and acrylic acid are known to impart multiple benefits to hard surface cleaners. Among the previously described benefits listed are for example the ability of amphoteric polymers to impart hydrophilic properties to hard surfaces. The imparted hydrophilicity to the surface is known to decrease the occurrence of water spotting, impart anti-misting, stain-resistance and/or mark-resistance properties. These highly hydrophilic amphoteric polymers are also known to provide some benefits reducing the drying time of the surface onto which the cleaning composition has been applied. However, there is an existing need for new polymers capable of providing suitable hydrophilicity with adequate quick drying time.

The presently disclosed ampholytic terpolymer meets just such a need. The inventors have discovered water soluble polymers such that when formulated in hard surface cleaners provides residual cleaning benefit for surface soils such as hard water stains, soap scum, mud, food, toilet stains, oil, grease, particulates and the like. But most importantly and surprisingly, the terpolymers also provide a faster drying benefit to surfaces after cleaning, allowing water to drain rapidly from vertical surfaces. This fast drying benefit is provided by incorporation of moderately hydrophobic monomers into the polymer which result in non-hydrophilic behavior of the treated surfaces after cleaning. The combination of easier cleaning and faster drying benefit is novel, as other polymers of this class in the prior art provide either: 1) highly hydrophilic surface modification that leads to spreading of water films and slow draining and drying, or 2) hydrophobic surface modification that leads to fast drying, but no residual cleaning benefit.

As mentioned above the incorporation of various ampholytic polymers in cleaning formulations is known.

Various publications teach the copolymer of diallydimethyl ammonium chloride and acrylic acid in cleaning compositions such as, EP835925, for example.

Multiple issued patents and applications describe terpolymers formed from diallydimethylammonium chloride, acidic acid and acrylamide. These patent applications and issued patents include PCT Application Nos. 97/45510, 07/068870 and WO2007068939, European Patent No. 0522756, Japanese Application No. 1997-169995, U.S. Pat. Nos. 5,981,456, 6,664,218, 6,593,288, 6,767,410, 6,924,260, 6,924,260, U.S. Pat. No. 6,905,814 and U.S Publication Nos. US2004/0013638, US2006/0270579, US2007/0213251, US2007/0105737.

Co-pending provisional application No. 61/133,460, filed on Jun. 30, 2008, herein incorporated by reference discloses amphoteric copolymers with antimisting properties. Co-pending U.S. Ser. No. 11/792,031, filed Nov. 28, 2005, herein incorporated entirely by reference discloses hydrophobically modified cationic polymers useful in hard surface cleaners.

The polymers described in the prior art provide easier cleaning benefits by providing hydrophilic surface modification to a treated surface. This type of modification has the disadvantage of generating uniform water films that are slow to drain from the surface. As a result, these polymers can lead to an increase in the time required for a treated surface to dry. In contrast, the present invention provides a moderately non-hydrophilic surface that allows water to drain rapidly, yet still provides an easier cleaning benefit for improved soil removal.

SUMMARY OF THE INVENTION

A hard surface cleaner comprising a terpolymer which terpolymer is formed from
a) a cationic monomer described by formula (I)

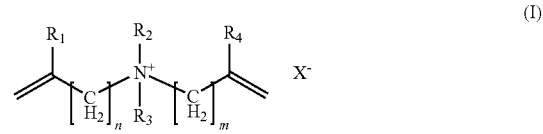

wherein: $R_1$ and $R_4$, independently of each other, represent a hydrogen atom or a linear or branched $C_1$-$C_6$ alkyl group; $R_2$ and $R_3$, independently of each other, represent an alkyl, hydroxyalkyl group wherein the alkyl group is a linear or branched $C_1$-$C_6$ chain;
n and m are integers between 1 and 3;
and
$X^-$ represents a counterion;
b) an anionic monomer selected from the group of monomers consisting of $C_3$-$C_8$ carboxylic, sulfonic, sulfuric, phosphonic or phosphoric acids, anhydrides and salts thereof;
c) a substituted (meth)acrylamide described by formula (II)

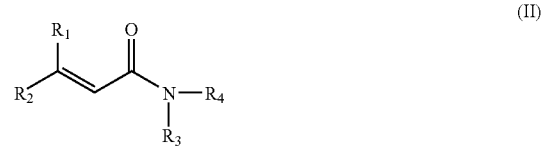

$R_1$ is hydrogen or methyl,
$R_2$ is hydrogen or $C_1$-$C_2$ alkyl,
$R_3$ and $R_4$ are independently $C_1$-$C_8$ alkyl;
and
d) optionally, a crosslinker.

The invention also encompasses a method for reducing the drying time, preferably on vertical surfaces, of a liquid cleaning composition comprising the steps of applying a cleaning composition, which cleaning composition comprises an efficient amount of a water-soluble or water-dispersible polymer which polymer is formed from components a), b), c) and optionally d) as described above.

DETAILED DESCRIPTION OF THE INVENTION

All percents unless stated otherwise are based on weight.

The term (meth)acrylic encompasses both acrylic and methacrylic derivatives.

Hard surface cleaners for purposes of the invention means cleaning formulations used in a typical cleaning procedure on any of a variety of hard surfaces found within the home or in commercial sites such as ceramic, stone, brick, glass, plastic, wood, laminate, metal, vinyl, composites and the like.

The most preferred hard surfaces are hydrophilic surfaces comprising glass and ceramic.

The term "monomer" is used to refer to a compound having at least monoethylenic unsaturation before polymerization.

After the monomer is polymerized and becomes part of a polymer, the monomer is referred to as a "monomer unit".

The term "polymer" includes homopolymers, copolymers, terpolymers and polymers including more than three different monomer units.

The term "terpolymer" includes polymers formed from at least three different monomer types.

Detailed Description of Polymer

Monomer a)

$$\underset{H_2}{\overset{R_1}{\underset{|}{C}}}=\underset{n}{\overset{}{C}}-\underset{R_3}{\overset{R_2}{\underset{|}{N^+}}}-\underset{m}{\overset{}{C}}-\underset{H_2}{\overset{R_4}{\underset{|}{C}}}=\quad X^- \qquad (I)$$

wherein: $R_1$ and $R_4$, independently of each other, represent a hydrogen atom or a linear or branched $C_1$-$C_6$ alkyl group; $R_2$ and $R_3$, independently of each other, represent an alkyl, hydroxyalkyl group wherein the alkyl group is a linear or branched $C_1$-$C_6$ chain; n and m are integers 1, 2 or 3; and $X^-$ represents a counterion.

$C_1$-$C_6$ alkyl is for example branched or unbranched radical $C_1$-$C_2$, $C_1$-$C_4$ alkyl, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl and n-hexyl.

Preferably $R_3$ and $R_4$ are $C_1$-$C_4$ alkyl or $C_1$-$C_2$ alkyl and $R_1$ and $R_2$ are preferably hydrogen.

Hydroxyalkyl is similarly defined as $C_1$-$C_6$ alkyl but the alkyl radical may be branched or unbranched and further substituted by 1, 2 or 3 hydroxy radicals. For example, the hydroxyl substituted alkyl may be —$CH_2OH$, —$CH_2CH_2OH$, —$CH_2(OH)CH_2CH_2OH$, —$CH_2CH_2CH(CH_3)CH_2OH$ and —$CH_2CH_2(OH)CH_3$.

The counterion $X^-$ may be virtually any counterion such as halogens including fluoride, chloride, bromide and iodide, sulfate or phosphate.

Most typically the monomers represented by formula (I) are for example, diallydialkylammonium monomers.

Those commonly available monomer of formula (I) include diallyldimethylammonium chloride (DADMAC), diallyldimethylammonium bromide, diallydimethylammonium sulfate, diallydimethylammonium phosphate, dimethyallydimethyammonium chloride, diethylallyldimethylammonium chloride, diallyldi(beta-hydroxyethyl)ammonium chloride and diallyldiethylammonium chloride.

Monomer b) is an anionic $C_3$-$C_8$ carboxylic, sulfonic, sulfuric, phosphonic or phosphoric acids, anhydrides and salts thereof.

Monomer b) will typically contain at least monoethylenic unsaturation.

Examples of $C_3$-$C_8$ carboxylic acidic or anhydride monomers include, but are not limited to, acrylic acid, methacrylic acid, ethacrylic acid, dimethylacrylic acid, maleic acid, maleic anhydride, succinic anhydride, methylenemalonic acid, crotonic acid, fumaric acid, itaconic acid, sorbic acid, angelic acid, cinnamic acid, styryiacryiic acid, citraconic acid, glutaconic acid, aconitic acid, phenylacrylic acid, citraconic acid, vinylbenzoic acid and mesaconic acid.

Sulfonic and sulfuric acid containing monomers include but are not limited to sulfoethylmethacrylate, sulfopropyl acrylate, styrenesulfonic acid, 2-acrylamido-2-methylpropane sulfonic acid (AMPS), ethylenesulfonic acid, vinyl sulphuric acid, 4-vinylphenyl sulphuric acid, 2-methyl-2-propene-1-sulfonic acid and 2-propene-1-sulfonic acid.

Phosphonic or phosphoric acid containing monomers include but are not limited to ethylene phosphonic acid, vinyl phosphoric acid, divinyl phosphonic acid, allyl phosphonic acid, methallyl phosphonic acid, methacrylamidomethane phosphonic acid, 2-arylamido-2-methylpropane phosphonic acid, 3-phosphonopropyl acrylate and 3-phosphonopropyl methacrylate.

Most typically the acid monomers are acrylic acid, methacrylic acid, maleic acid and 2-acrylamido-2-methylpropane sulfonic acid (AMPS). The copolymers useful in this invention may contain the above acidic monomers in either the salt or free acid form. The salts may for instance, be alkali metal, alkaline earth metal, and ammonium salts.

Monomer c) is Represented by the Formula (II)

$$\underset{R_2}{\overset{R_1}{\underset{}{}}}C=C-\overset{O}{\underset{}{C}}-N\underset{R_3}{\overset{}{}}-R_4 \qquad (II)$$

$R_1$ is hydrogen or methyl, $R_2$ is hydrogen or $C_1$-$C_2$ alkyl, $R_3$ and $R_4$ are independently linear or branched $C_1$-$C_8$ alkyl.

$C_1$-$C_8$ alkyl is for example branched or unbranched radical $C_1$-$C_2$, $C_1$-$C_4$, $C_1$-$C_6$ alkyl, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-octyl, n-heptyl, isoheptyl, 1,1,3,3-tetramethylbutyl, 1-methylheptyl, 3-methylheptyl and 2-ethylhexyl.

Preferably $R_3$ and $R_4$ are independently linear $C_1$-$C_4$ alkyl or $C_1$-$C_2$ alkyl.

Respresentative substituted (meth)acrylamides are N,N-dialkyl(meth)acrylamide Derivatives such as N,N-dimethyl (meth)acrylamide, N,N-methylethyl(meth)acrylamide, N,N-diethyl(meth)acrylamide, N,N-methylpropyl(meth)acyralmide, N,N-ethylpropyl(meth)acrylamide, N,N-methylpropyl(meth)acrylamide, N,N-dipropyl(meth)acrylamide, N,N-methylbutyl(meth)acrylamide, N,N-ethylbutyl(meth)acrylamide, N,N-dibutyl(meth)acrylamide and N,N-propylbutyl(meth)acrylamide, N,N-dipentyl(meth)acrylamide, N,N methylpentyl(meth)acrylamide, N,N-ethylpentyl(meth)acrylamide, N,N-propylpentyl(meth)acrylamide, N,N-butylpentyl(meth)acrylamide, N,N-dihexyl(meth)acrylamide, N,N-methylhexyl(meth)acrylamide, N,N-ethylhexyl(meth)acrylmide, N,N-propylhexyl(meth)acrylmide, N,N-butylhexyl(meth)acrylamide, N,N-pentylhexyl(meth)acrylmide, N,N-diheptyl(meth)acrylamide, N,N-methylheptyl(meth)acrylamide, N,N-ethylheptyl(meth)acrylamide, N,N-propylheptyl(meth)acrylamide, N,N-butylheptyl(meth)acrylamide, N,N-pentylheptyl(meth)acrylamide, N,N-dioctyl(meth)acrylamide, N,N-methyloctyl(meth)acrylamide, N,N-ethyloctyl(meth)acrylamide, N,N- propyloctyl(meth)acrylamide, N,N-butyloctyl(meth)acrylamide, N,N-pentyloctyl(meth)acrylamide and N,N-heptyloctyl(meth)acrylamide.

The polymer formed from monomers a), b), c) and optionally d) may also contain an additional monomer e) selected from nonionic monomers.

For example, optional nonionic components e) may be (meth)acrylamide, branched or unbranched $C_1$-$C_6$ alkyl (meth)acrylate esters, hydroxyl substituted $C_1$-$C_6$ alkyl (meth)acrylate esters, N-methylacrylamide, poly $C_2$-$C_3$alkoxylated esters of acrylic acid and of methacrylic acid, in particular the polyethylene glycol and polypropylene glycol esters of (meth)acrylate. Further nonionic components envisioned are vinyl acetate, vinyl pyrrolidone, 2-vinylpyridine and 4-vinylpyridine.

The vinyl acetate monomer unit may be hydrolyzed to vinyl alcohol.

The optional nonionic monomer of component e) is preferably water-soluble.

A water soluble monomer for purposes of the invention means at least 1, 2 or 3 wt. % of the monomer is soluble in water (at 20° C.).

Thus for example the polymer formed from a), b), c) and optionally d) and e) may for example have the formula (III) or (IV) below.

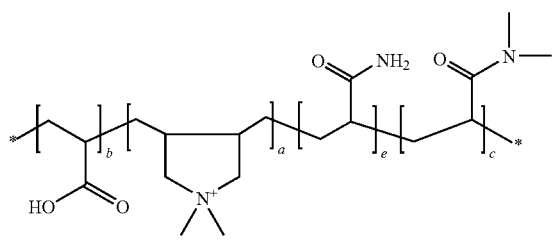

(III)

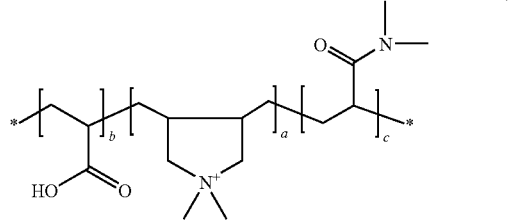

(IV)

wherein a, b, c, d and e represent the molar ratios of each monomer unit or a weight % of the total formed polymer.

\* may for example be a terminal group such as a catalyst fragment or an end capping group.

Weight Ratios of Components a), b), c) and Optional Components d) and e)

Component a) monomer may make up at least about 0.5 to about 40, about 1 to about 35, about 2 to about 30, about 5 to about 25 wt. % of the total formed polymer. Typically, component a) will contain a minimum amount of component a) of about 2, 4, 6, 8, 10, 12, 14 or 16 wt. % with a maximum of about 10, 20, 30 or 40 wt. %.

Component b) monomer may make up at least about 0.1 to about 20, about 0.5 to about 15, about 0.7 to about 12, about 1 to about 8 wt. % of the total polymer. Most typically the anionic component b) will be a minimum of about 2, 3 or 4 wt. percent of the total weight of the formed polymer with a maximum of about 5, 10, 15, or 20 wt. %.

The weight ratio of component c) can be any amount. Most typically however, monomer c) makes up about 15 to about 95 weight percent of the total weight of the formed polymer. For example component c) may be about 20 to about 90, about 30 to about 90 or about 35 to about 85 wt. % of the total weight of formed polymer.

Component monomer c) is nonionic and moderately hydrophobic. Thus anyone of the alkyl groups on the amide functionality ($R_3$ and $R_4$) will typically not exceed $C_8$ alkyl, preferably $C_6$ alkyl, most preferably $C_4$ alkyl or especially $C_2$ alkyl.

Typically, the weight of component c) will be at least about 30, 35, 40, 45, 50 weight % of the formed polymer with a maximum amount of component c) monomer of about 80, 85, 90 or 95 wt. % of the formed polymer.

The sum of the weight of monomers a) and b) will range from about 60 to about 4 weight % of the total weight of the formed terpolymer. For example, the sum of monomers a) and b) may be about 60 to about 8, about 55 to about 10, about 50 to about 15 or about 45 to about 20 of the total weight of the formed terpolymer. Typically, the weight percent of monomers a) and b) will be less than about 60 weight % or less than about 50 weight percent with a minimum of at least about 15, 20, 25, 30, 35 or 40 weight percent.

The molar ratio of monomer a) to monomer b) can be 1:10 to 10:1. For example, the molar ratio of monomer a) to monomer b) is about 1:5 to about 5:1, about 1:4 to about 4:1, about 1:3 to about 3:1 and about 1:2 to about 2:1. Typically, the molar ratio of monomer a) to monomer b) is about 2:1 to about 1.1:1.

The molar amount of monomer b) will for example be less or greater than the molar amount of monomer a). For example, the molar ratio of a) to b) will range from 1.1:1 to 5:1, 1.1:1 to 4:1, more typically 1.1:1 to 3:1 or 1.1:1 to 2:1.

Alternatively, for example, the molar ratio of a) to b) will range from 1:1.1 to 1:5, 1:1.1 to 1:4, more typically 1:1.1 to 1:3 or 1:1.1 to 1:2.

Another way of looking at the molar ratio of a) to b) is to determine the net charge of the terpolymer. For example, the cationic net charge on the terpolymer may range for example from about −0.10 to about 1.5, about 0.0 to about 1.5, about 0.1 to about 0.8, or about 0.1 to about 0.5 meq/g.

Another way of expressing the molar relationship between components a) and b) is to say that component a) will for example exceed the molar amount of component b) incorporated into the terpolymer by at least 10%. Alternatively, component b) will for example exceed the molar amount of component a) incorporated into the terpolymer by no more than 10% or 15%.

The terpolymers of the invention may optionally contain a crosslinker d). Crosslinked means that the terpolymer may additionally contain comonomers having multi-ethylenic unsaturation (other than component a) monomer).

The polymer may be crosslinked or uncrosslinked.

Typical crosslinkers are methylenebisacrylamide (MBA); methylenebismethacrylamide; esters of unsaturated monocarboxylic and polycarboxylic acids with polyols, diacrylates and triacrylates, dimethacrylates and trimethacrylates, butanediol and ethylene glycol diacrylate and methacrylate, diethylene glycol diacrylate, poly(ethylene glycol) diacrylate, poly(propylene glycol) diacrylate, tetrallylammonium chloride (TAAC), trimethylolpropane triacrylate (TMPTA), penta erythritol triacrylate (PETA) and trimethylolpropane trimethacrylate (TMPTMA). Allyl compounds may also be considered such as allyl (meth)acrylate, triallyl cyanurate, diallyl maleate, polyallyl esters, tetraallyloxyethane, triallylamine, tetraallylethylenediamine; allyl esters of phosphoric acid; and/or vinylphosphonic acid derivatives.

The crosslinkers are for example at least difunctional ethylenic unsaturated monomers and will be added during the formation of the terpolymer at amounts that range from 20 to 10,000 ppm of the total monomer content. For example, 20 to 1000 ppm, 50 to 800 ppm or 75 to 600 ppm are envisioned.

Some particularly preferred crosslinkers are methylenebisacrylamide (MBA); methylenebismethacrylamide.

The weight fraction of crosslinking comonomers, based on the total mass of the copolymers, is not more than 5%, 3% or 2% by weight, more typically from 0.00002 to 2% by weight, and most preferably from 0.00002 to 1% by weight.

The formed polymer may be cationically or anionically charged at the conditions of use.

Preferably the polymer is cationically charged.

The optional nonionic monomer of component e), may make up about 30 to about 0, about 25 to about 1, about 20 to about 2, about 10 to about 5 weight % of the formed polymer. For example, about 30 to about 10 or about 5 weight % is envisioned.

The formed polymer may be 100 to about 60 weight % monomer components a), b), c) and optionally d). For example, the formed polymer may be about 60, 65, 70, 75, 85, 80, 90 or about 95 wt. % components a), b), c) and optionally d). Typically the formed polymer will contain about 60 to 100 or about 70 to about 100 weight percent a), b), c) and optionally d).

The polymer added to the cleaning formulation is about 10,000 to about 10,000,000 average molecular weight (Mw). For example, the Mw is about 15,000 to about 5,000,000, about 20,000 to about 2,500,000 or about 50,000 to about 1,250,000.

The average molecular weight is determined by GPC against PEO standard.

The ampholytic polymer may be random, block, grafted or gradient.

The ampholytic polymer may be linear or branched.

The polymer is water soluble or water dispersible. Water soluble for purposes of the invention means that the polymer is soluble at about 5, about 10 or about 15 wt. % at 25° C.

Advantages of Cleaning Formulations Incorporating Polymer

One of the advantages of the presently claimed polymer in hard surface cleaners is the polymer reduces the time of drying vertical surfaces. While not wishing to be bound by theory, a hydrophobic surface forces the water droplets to bead up. If the surface is vertical such as in an electric dishwasher where plates are stacked on their edges, the water droplets have a tendency to roll down quickly, thus providing fast drainage. The higher the hydrophobic character of the surface, the higher is the water contact angle and faster is the draining characteristic.

During the cleaning procedure, the polymer in the formulation adsorbs onto the surface, forming a thin invisible film that remains after the surface is cleaned. Upon subsequent soiling, the film causes any new soil layers to be easily removed from the surface. In this manner, the polymer of this invention results in easier removal of soil, and can also prevent soil from adhering to a surface.

The cleaning formulations of this invention provide significantly improved cleaning performance on tough soils and are easily incorporated into existing cleaning solutions. The adsorption of the film to the surface during the cleaning step provides both a soil release mechanism and a soil resistant mechanism. In addition, surfaces treated with these formulations drain and dry more quickly than untreated surfaces. Cleaning products containing these polymers will provide significant consumer benefit over existing products without soil release/fast drying technology.

Thus the inventive polymer may be incorporated into hard surface cleaning compositions for doing the washing up in a dishwasher or by hand, or for cleaning glass panels, bathrooms, sinks, motor vehicle bodyworks, shower walls, toilet pans and glass-ceramic plates.

An additional advantage of these materials is their compatibility with a wide range of cleaning formulations, both acidic and basic, containing either cationic, anionic or nonionic surfactants. Other commercially available polymers for surface cleaning formulations are often limited to specific cleaning formulation types and are not universally compatible.

This invention may have utility in a broad range of home care applications such as bathroom cleaners, hard surface cleaners, toilet care, dishwashing, etc. In addition, these materials may be useful for cleaning of automobiles, boats, canopies, indoor or outdoor furniture, windows, or other surfaces.

The cleaning composition containing the polymer is especially useful when formulated into an electric dishwashing or hand dishwashing composition.

The inventive polymer may also be used as a treatment for hard surfaces. When the inventive polymer is applied in a liquid medium to the hard surface, the residual polymer provides a slightly hydrophobic effect which leads to improved drying rates of the hard surface. The polymer also functions to make subsequent cleanings of the surface easier.

The Cleaning Formulation

The polymer of the present invention is added to the cleaning formulation at a level of between approximately 0.01% and 10% active level, for example 0.01% to 5%, about 0.1% to about 3%, 0.2% to 2%, 0.3% to 1.5% such that the polymer is dissolved or is uniformly dispersed.

One of the particular advantages of the terpolymer is its ease of incorporation into both acidic and basic formulations. For example, 0.1, 0.2, 0.3, 0.4, 0.5, 0.6, 0.7, 0.9 and 1 wt. % is easily added to the basic or acidic formulation without precipitation.

Optional Components in Cleaning Composition

The cleaning formulations are typically aqueous solutions of various components typically found within cleaning products, including surfactants, solvents, hydrotropes, chelators, builders, acids, bases, thickeners, perfumes, preservatives and the like.

Water

The compositions of the present invention usually comprise an aqueous liquid carrier that includes water and optionally one or more organic solvents. Water typically comprises from about 50% to about 100%, for example about 60% to about 98%, from about 80% to about 96% of the aqueous carrier, with the optional solvent forming the balance. Deionized or softened water is preferred.

Solvent

The solvent is typically used to dissolve various components in the improved cleaning composition so as to form a substantially uniformly dispersed mixture. The solvent can also function as (i) a cleaning agent to loosen and solubilize greasy or oily soils from surfaces, (ii) a residue inhibiting agent to reduce residues left behind on a cleaned surface, (iii) a detergent agent, and/or (iv) a disinfecting, sanitizing, and/or sterilizing agent.

The solvent, when used, can be premixed with the other components of the cleaning composition or be partially or fully added to the improved cleaning composition prior to use. The solvent may be water soluble and/or it is a water dispersable organic solvent. The solvent can be selected to have the desired volatility depending on the cleaning application.

Suitable solvents include, but are not limited to, $C_{1-6}$ alkanols, $C_{1-6}$ diols, $C_{1-10}$ alkyl ethers of alkylene glycols, $C_{3-24}$ alkylene glycol ethers, polyalkylene glycols, short chain carboxylic acids, short chain esters, isoparafinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes. Water insoluble solvents such as isoparafinic hydrocarbons, mineral spirits, alkylaromatics, terpenoids, terpenoid derivatives, terpenes, and terpene derivatives can be mixed with a water soluble solvent when employed.

Surfactants

The cleaning composition may include an effective amount of surfactant for improving the cleaning performance, stabilizing the cleaning composition and emulsifying the cleaning components. Conventional nonionic, anionic, cationic, zwitterionic, and/or amphoteric surfactants can be employed. Suitable surfactants are described in *McCutcheon's Emulsifiers and Detergents* (1997), Kirk-Othmer, Encyclopedia of Chemical Technology, 3rd Ed., Volume 22, pp. 332-432 (Marcel-Dekker, 1983), and *McCutcheon's Soaps and Detergents* (N. Amer. 1984), which are incorporated herein by reference.

Thus the hard surface cleaner will typically contains a nonionic, anionic, cationic, amphoteric or zwitterionic surfactant.

Suitable surfactants include, but is not limited to, glycoside, glycols, ethylene oxide and mixed ethylene oxide/propylene oxide adducts of alkylphenols and alcohols, the ethylene oxide and mixed ethylene oxide/propylene oxide adducts of long chain alcohols or of fatty acids, mixed ethylene oxide/propylene oxide block copolymers, esters of fatty acids and hydrophilic alcohols, sorbitan monooleates, alkanolamides, soaps, alkylbenzene sulfonates, olefin sulfonates, paraffin sulfonates, propionic acid derivatives, alcohol and alcohol ether sulfates, phosphate esters, amines, amine oxides, alkyl sulfates, alkyl ether sulfates, sarcosinates, sulfoacetates, sulfosuccinates, cocoamphocarboxy glycinate, salts of higher acyl esters of isethionic acid, salts of higher acyl derivatives of taurine or methyltaurine, phenol poly ether sulfates, higher acyl derivatives of glycine and methylglycine, alkyl aryl polyether alcohols, salts of higher alkyl substituted imadazolinium dicarboxylic acids, tannics, naphthosulfonates, monochloracetics anthraflavinics, hippurics, anthranilics, naphthoics, phthalics, carboxylic acid salts, acrylic acids, phosphates, alkylamine ethoxylates, ethylenediamine alkoxylates, betaines, sulfobetaines, and imidazolines.

Lauryl sulfate, laurylether sulfate, cocamidopropylbetaine, alkyl polyglycosides, and amine oxides can also be employed as surfactants. The amine oxides can be ethoxylated and/or propoxylated. One specific amine oxide includes, but is not limited to, alkyl di(hydroxy lower alkyl) amine oxides, alkylamidopropyl di(lower alkyl)amine oxides, alkyl di(lower alkyl)amine oxides, and/or alkylmorpholine oxides, wherein the alkyl group has 5-25 carbons and can be branched, unbranched, saturated, and/or unsaturated. Nonlimiting examples of amine oxides include, but are not limited to, lauryldimethylamine oxide.

Surfactants may also include ethoxylated alcohols having an alkyl group typically with 6-22 carbons; the alkyl group is preferably linear but could be branched. Furthermore, the carbon groups can be saturated or unsaturated. Suitable ethoxylated alcohols include the SURFONIC L series surfactants by Huntsman. Fluorosurfactants can also be used as the surfactant. A suitable fluorosurfactant is an ethoxylated noninoic fluorosurfactant. Suitable ethoxylated noninoic fluorosurfactants include the ZONYL surfactants by DuPont.

Suitable silicone based surfactants can also be used. These are for example, SURFYNOL surfactants by Air Products.

Cationic surfactants are, in particular, alkylammonium salts of formula

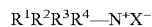

where $X^-$ represents a halide, $CH_3SO_4^-$ or $C_2H_5SO_4^-$ ion $R_1$ and $R_2$ are alike or different and represent a $C_1$-$C_{20}$ alkyl radical or an aryl or benzyl radical $R_3$ and $R_4$ are alike or different and represent a $C_1$-$C_{20}$ alkyl radical, an aryl or benzyl radical or an ethylene oxide and/or propylene oxide condensate $(CH_2CH_2O)_x$—$(CH_2CHCH_3O)_y$—H, where x and y range from 0 to 30 and are never simultaneously zero, such as cetyltrimethylammonium bromide.

Other examples include alkyl quaternary ammonium compounds which contain at least two nitrogen-bonded alkyl chains having at least about 16 carbon atoms such as distearyldiammonium chloride and ditallowediammonium chloride; $C_8$ to $C_{18}$ fatty alkyl amines, amidoalkylamines and amidoalkanolamines, and their salts; ethoxylated amines; amine oxides; and immidazoline.

Typically the surfactant is partially or fully soluble in water. When employed, the surfactant comprises at least about 0.001% and typically 0.01-10% of the cleaning composition. The amount of surfactant may exceed 10% when the cleaning composition is formulated in concentrate. Preferably, the surfactant content is about 0.1-2%.

Antimicrobial Agent

An antimicrobial agent can also be included in the cleaning composition. Non-limiting examples of useful quaternary compounds that function as antimicrobial agents include benzalkonium chlorides and/or substituted benzalkonium chlorides, di($C_6$-$C_{14}$)alkyl di short chain (($C_{1-4}$ alkyl and/or hydroxyalkl) quaternaryammonium salts, N-(3-chloroallyl) hexaminium chlorides, benzethonium chloride, methylbenzethonium chloride, and cetylpyridinium chloride. The quaternary compounds useful as cationic antimicrobial actives are preferably selected from the group consisting of dialkyldimethyl ammonium chlorides, alkyldimethylbenzylammonium chlorides, dialkylmethylbenzylammonium chlorides, and mixtures thereof. Biguanide antimicrobial actives including, but not limited to polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are especially preferred. Typical concentrations for biocidal effectiveness of these quaternary compounds, especially in the preferred low-surfactant compositions herein, range from about 0.001% to about 0.8% and preferably from about 0.005% to about 0.3% of the usage composition. The weight percentage ranges for the biguanide and/or quat compounds in the cleaning composition is selected to disinfect, sanitize, and/or sterilize most common household and industrial surfaces.

Non-quaternary biocides are also useful in the present compositions. Such biocides can include, but are not limited to, alcohols, peroxides, boric acid and borates, chlorinated hydrocarbons, organometallics, halogen-releasing compounds, mercury compounds, metallic salts, pine oil, organic sulfur compounds, iodine compounds, silver nitrate, quaternary phosphate compounds, and phenolics.

Preferred antimicrobial agents also include organic acids, such as, acetic, lactic, sulfamic and glycolic acids.

Preservatives

Preservatives, when used, include, but are not limited to, mildewstat or bacteriostat, methyl, ethyl and propyl parabens, short chain organic acids (e.g. acetic, lactic and/or glycolic acids), bisguanidine compounds (e.g. Dantogard and Dantogard Plus both from Lonza, Inc. and/or Glydant) and/or short chain alcohols (e.g. ethanol and/or IPA).

Bacteriostats

The mildewstat or bacteriostat includes, but is not limited to, mildewstats (including non-isothiazolone compounds) include Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, Na.sup.+ salt, from Nipa Laboratories Ltd., DOWICIDE A, a 1,2-Benzoisothiazolin-3-one, from Dow Chemical Co., and IRGASAN DP 200, a 2,4,4'-trichloro-2-hydroxydiphenylether, from Ciba Corp.

Builder/Buffer

The cleaning composition may include a builder detergent which increase the effectiveness of the surfactant. The builder detergent can also function as a softener and/or a sequestering and buffering agent in the cleaning composition. A variety of builder detergents can be used and they include, but are not limited to, phosphate-silicate compounds, zeolites, alkali metal, ammonium and substituted ammonium polyacetates, triaikali salts of nitrilotriacetic acid, carboxylates, polycarboxylates, carbonates, bicarbonates, polyphosphates, aminopolycarboxylates, polyhydroxysulfonates, and starch derivatives.

Builder detergents can also include polyacetates and polycarboxylates. The polyacetate and polycarboxylate compounds include, but are not limited to, sodium, potassium, lithium, ammonium, and substituted ammonium salts of ethanol diglycine, methylglycine, diacetic acid, ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builder detergents can also exist either partially or totally in the hydrogen ion form.

The builder agent can include sodium and/or potassium salts of EDTA and substituted ammonium salts. The substituted ammonium salts include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

Buffering and pH adjusting agents such as acids and bases, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2methylpropanol. Preferred buffering agents for compositions of this invention are nitrogen-containing materials. Some examples are amino acids such as lysine or lower alcohol amines like mono-, di-, and tri-ethanolamine. Other preferred nitrogen-containing buffering agents are tri(hydroxymethyl)amino methane $(HOCH_2)_3CNH_3$ (TRIS), 2-amino-2-ethyl-1,3-propanediol, 2-amino-2-methyl-propanol, 2-amino-2-methyl-1,3-propanol, disodium glutamate, N-methyl diethanolamide, 2-dimethylamino-2-methylpropanol (DMAMP), 1,3-bis (methylamine)-cyclohexane, 1,3-diamino-propanol N,N'-tetra-methyl-1,3-diamino-2-propanol, N,N-bis(2-hydroxyethyl)glycine (bicine) and N-tris(hydroxymethyl)methyl glycine (tricine). Other suitable buffers include ammonium carbamate, citric acid, acetic acid. Mixtures of any of the above are also acceptable. Useful inorganic buffers/alkalinity sources include ammonia, the alkali metal carbonates and alkali metal phosphates, e.g., sodium carbonate, sodium polyphosphate. For additional buffers see *McCutcheon's Emulsifiers and Detergents*, North American Edition, 1997, McCutcheon Division, MC Publishing Company Kirk and WO 95/07971 both of which are incorporated herein by reference.

When employed, the builder detergent comprises at least about 0.001% and typically about 0.01-5% of the cleaning composition. The amount of the builder detergent may exceed about 5% when the cleaning composition is formulated as a concentrate. Preferably, the builder detergent content is about 0.01-2%.

Cleaning compositions for removing soap scum and limescale may for example include an acid and thus will have a pH below 7, in some embodiments below about 4 and in some embodiments below about 3, 2 or about 1. The acids can be organic, inorganic or a mixture thereof.

Representative of the various organic acids are citric acid, lactic acid, maleic acid, malic acid, glycolic acid, succinic acid, glutaric acide, adipic acid and mixtures thereof. Representative of the various inorganic acids that can be used are sulphuric acid, sulfamic acid, chlorhydric acid, phosphoric acid, nitric acid and mixtures thereof.

Cleaning compositions or compositions suitable for use on nonporous hard surfaces such as glass or mirrors and effective for applying a film onto the nonporous surface, may for example also include basic substances. Thus the composition will have a pH above 7, in some embodiments above 9 or 10, and in some cases as high as 11 and above.

Suitable bases include sodium, potassium, lithium, and ammonium hydroxides and amines. Alkanolamines are also envisioned such as diethanolisopropanolamine and diglycoldiisopropanolamine.

Surprisingly the present terpolymer when incorporated in either a basic, acidic or neutral cleaning composition does not precipitate out of the composition. When the terpolymer is added to the cleaning composition at an effective amount, the terpolymer stays dispersed or dissolved within the formulation, preferably forming clear solutions.

Additional Adjuvants

The cleaning composition may includes additional adjuncts. The adjuncts include, but are not limited to, fragrances or perfumes, waxes, dyes and/or colorants, solubilizing materials, stabilizers, thickeners, defoamers, hydrotropes, lotions and/or mineral oils, enzymes, bleaching agents, cloud point modifiers, preservatives, and other polymers. The waxes, when used, include, but are not limited to, carnauba, beeswax, spermacet, candelilla, paraffin, lanolin, shellac, esparto, ouricuri, polyethylene wax, chlorinated naphthaline wax, petrolatu, microcrystalline wax, ceresine wax, ozokerite wax, and/or rezowax. The solubilizing materials, when used, include, but are not limited to, hydrotropes (e.g. water soluble salts of low molecular weight organic acids such as the sodium and/or potassium salts of xylene sulfonic acid). The acids, when used, include, but are not limited to, organic hydroxy acids, citric acids, keto acid, and the like. Thickeners, when used, include, but are not limited to, polyacrylic acid, xanthan gum, calcium carbonate, aluminum oxide, alginates, guar gum, methyl, ethyl, clays, and/or propylhydroxycelluloses. Defoamers, when used, include, but are not limited to, silicones, aminosilicones, silicone blends, and/or silicone/hydrocarbon blends. Lotions, when used, include, but are not limited to, achlorophene and/or lanolin. Enzymes, when used, include, but are not limited to, lipases and proteases, and/or hydrotropes such as xylene sulfonates and/or toluene sulfonates. Bleaching agents, when used, include, but are not limited to, peracids, hypohalite sources, hydrogen peroxide, and/or sources of hydrogen peroxide.

Absorbent Materials

The cleaning composition of the present invention can be used independently from or in conjunction with an absorbent and/or adsorbent material. For instance, the cleaning composition can be formulated to be used in conjunction with a cleaning wipe, sponge (cellulose, synthetic, etc.), paper towel, napkin, cloth, towel, rag, mop head, squeegee, and/or other cleaning device that includes an absorbent and/or adsorbent material.

The cleaning wipe can be made of nonwoven material such as nonwoven, fibrous sheet materials or meltblown, coform, air-laid, spunbond, wet laid, bonded-carded web materials, and/or hydroentangled (also known as spunlaced) materials. The cleaning wipe can also be made of woven materials such as cotton fibers, cotton/nylon blends and/or other textiles. The cleaning wipe can also include wood pulp, a blend of wood pulp, and/or synthetic fibers, e.g., polyester, rayon, nylon, polypropylene, polyethylene, and/or cellulose polymers.

When the cleaning formulation is incorporated in an absorbent material, the cleaning composition may include an effective amount of release agent to increase the amount of polymer released from the cleaning wipe onto a surface. The release agent is preferably an ionic species designed to compete with the polymer for sites on the cleaning wipe thereby causing increased polymer release from the cleaning wipe during use of the cleaning wipe. The release agent may include a salt. A variety of different salts can be used such as, but not limited to, monovalent salts, divalent salts, organic salts, and the like.

During the cleaning procedure, the polymer in the formulation adsorbs onto the surface, forming a thin invisible film that remains after the surface is cleaned. Upon subsequent soiling, the film causes any new soil layers to be easily removed from the surface. In this manner, the polymer of this invention results in easier removal of soil, and can also prevent soil from adhering to a surface.

The cleaning composition containing the polymer can take any form that would allow suitable treatment of the hard surface needing to be cleaned. This could include pourable or sprayable liquids, dilutable liquids, creams or pastes, aerosols, liquids that are pre-applied in a wiping product, concentrate, a gel, solid or dry products that must first be combined with water.

Preparation of the Polymers

The ampholyte terpolymers of the present invention may be prepared in a straightforward manner by using the process described immediately below.

The polymers used in the hard surface cleaners are made by standard solution polymerization (aqueous).

The present terpolymers of the invention are water soluble or water dispersible.

Water-soluble terpolymers for purposes of the invention means the polymer forms a clear solution at the range of use.

The copolymers of the invention can be obtained according to the known techniques for preparing copolymers, in particular by radical-mediated polymerization of the ethylenically unsaturated starting monomers which are known compounds or which can readily be obtained by a person skilled in the art using conventional synthetic processes of organic chemistry.

The radical-mediated polymerization is preferably carried out in an oxygen-free environment, for example in the presence of an inert gas (helium, argon, etc.) or nitrogen. The reaction is carried out in an inert solvent, preferably methanol or ethanol, and more preferably in water.

The polymerization is initiated by adding a polymerization initiator. The initiators used are the free-radical initiators usually used in the art. Examples comprise organic peresters (t-butyl peroxypivalate, t-amyl peroxypivalate, t-butyl peroxy-.alpha.-ethylhexanoate, etc.); organic compounds of azo type, for example azobisamidinopropane hydrochloride, azobisisobutyronitrile, azobis(2,4-dimethyl-valeronitrile, etc.); inorganic and organic peroxides, for example hydrogen peroxide, benzyl peroxide and butyl peroxide, etc; redox initiator systems, for example those comprising oxidizing agents, such as persulfates (in particular ammonium or alkali metal persulfates, etc.); chlorates and bromates (including inorganic or organic chlorates and/or bromates); reducing agents such as sulfites and bisulfites (including inorganic and/or organic sulfites or bisulfites); oxalic acid and ascorbic acid, as well as mixtures of two or more of these compounds.

The preferred initiators are water-soluble initiators. Sodium persulfate and azobisamidinopropane hydrochloride are particularly preferred.

As a variant, the polymerization can be initiated by irradiation with ultraviolet light. The amount of initiators used is generally an amount which may be sufficient for initiating the polymerization. The initiators are preferably present in an amount ranging from 0.001% to approximately 10% by weight relative to the total weight of the monomers, and are preferably in an amount of less than 0.5% by weight relative to the total weight of the monomers, a preferred amount being in the range from 0.005% to 0.5% by weight relative to the total weight of the monomers. The initiator is added to the polymerization mixture in a continuous or batchwise manner.

The reaction may be run at about 50° C. to about 125° C., preferably about 60° C. to about 120° C., and most especially about 80° C. to about 110° C.

The total reaction time may vary from 1 to about 10 hours.

EXAMPLES

Preparation of Polymers for Cleaning Formulations

Example 1

A one liter reactor is purged with nitrogen. Initial charges of 15.5 g DADMAC (65.9%) solution, 1.3 g N,N-dimethyl acrylamide, 40 mg acrylic acid (99%) solution, 1.5 g of NaEDTA (10%) solution and 250 g of deionized water are added to the reactor. The reaction mixture pH is adjusted to about 4.0+/−0.2 with HCl (5%) solution. The reactants are stirred at 210 rpm and heated to 100° C. A monomer feed is prepared from 6.7 g of DADMAC (65.9%) solution, 54 g N,N-dimethyl acrylamide, 3.25 g acrylic acid (99%) solution, 70 mg mercaptoacetic acid and 110 g deionized water. The feed solution pH is adjusted to about 4.0+/−0.2 with NaOH (10%) solution. 5 mL of the monomer feed is initially charged to the reactant mixture. The intiator (ammonium persulfate, 0.2 g in 20 ml water) is introduced at a rate of 0.22 ml/min while the remaining monomer feed is fed over 60 min. After completion of the monomer feed, the container holding the monomer feed is rinsed with 10 mL deionized water and charged to the reactor. Initiator feed is continued at the same rate until complete. The batch is held at 100° C. for an additional 0.5 hr.

A post treatment feed of sodium metabisulfite (2 wt % aqueous solution, 3 ml) is added at the rate of 0.6 ml/min until complete. The batch is then maintained at 100° C. for another 0.5 hr. The reactor is cooled and the product is discharged.

A terpolymer of N,N-dimethylacrylamide/diallydimethylammonium/acrylic acid (75.6/20/4.4 respective wt % monomer content) is produced. The terpolymer carries an excess positive charge, that is the molar ratio of DADMAC to acrylic acid is greater than 1. The average molecular weight is 120 kilodalton. The charge on the terpolymer is 0.63 meq/g.

Several Polymers are prepared as described above but the weight percent of monomers are varied. In several cases an additional nonionic monomer, acrylamide is added.

TABLE 1

Polymers Formed From Monomers M1, M2, M3 and Optionally M4.

| Example | M1 (wt. %) | M2 (wt. %) | M3 (wt. %) | M4 (wt. %) | M5 | M6 | Mw ($10^3$) | Mn ($10^3$) | X-Linked |
|---|---|---|---|---|---|---|---|---|---|
| 1 | 20 | 4.4 | 75.6 | — | | | 120 | 20.5 | No |
| 2 | 20 | 4.4 | 55.6 | 20 | | | 974 | 49.3 | Yes |
| 3 | 20 | 4.4 | 75.6 | — | | | 420 | 43.7 | Yes |
| 4 | 20 | 4.4 | 55.6 | 20 | | | 132 | 18.7 | No |
| 5 | 40 | 8.8 | 51 | — | | | | | No |
| 6 | 15.4 | — | 80 | — | 5.2 | | | | No |
| 7 | 20 | — | 47.4 | 20 | | 12.6 | | | Yes |
| 8 | 20 | 2.2 | 30 | 41.5 | — | 6.3 | | | No |

M1 is diallydimethylammonium chloride (DADMAC)
M2 is acrylic acid.
M3 is N,N-dimethylacrylamide.
M4 is acrylamide (unsubstituted).
M5 is methacrylic acid.
M6 is 2-acrylamido-2-methylpropane sulfonic acid (AMPS).

All polymers are soluble in water up to about 10 wt. %.

Crosslinker is methylene bisacryamide (MBA). 300 ppm of MBA based on total monomers charged.

Typical Formulations Containing Polymers

Manual Dishwashing Liquid, Green Apple

| Ingredient | Chemical Description | Weight % (active) |
|---|---|---|
| D.I. Water | | Qs |
| CALSOFT L-60 | sodium dodecyl benzene sulfonate | 24 |
| CALFOAM EA-703 | ammonium laureth sulfate | 4.2 |
| SXS (40%) | sodium xylene sulfonate | 4.82 |
| citric acid (10%) | | 0.11 |
| GLUCOPON 625 UP | lauryl polyglucoside | 3 |
| Ninol 40-CO | cocoamide DEA | 3 |
| trisodium EDTA | | 1 |
| DANTOGUARD | DMDM Hydantoin | 0.04 |
| Polymer (example 3) | | 0.5 |
| IRAGON YELLOW AYE23 (0.5%) | | 0.6 |
| IRAGON BLUE ABL9 (0.1%) | | 0.2 |
| TINOGARD APA | | 0.05 |
| Apple Frenzy | | 0.07 |
| | % solids | 40.67 |

Automatic Dishwashing Detergent

| Ingredient | Chemical Description | Weight % (active) |
|---|---|---|
| Eltesol SX pellets | sodium xylene sulfonate | 6.50 |
| Sodium metasilicate | | 4.00 |
| Empilan KA590 | alchohol ethoxylate | 1.00 |
| Surfadone LP-100 (ISP) | Surfactant | 1.00 |
| Potassium hydroxide | | 3.00 |
| Polymer (Example 2) | | 0.5 |
| EDTA | | 0.15 |
| Tetrapotassium pyrophosphate | | 15.00 |
| Isopropyl alcohol | | 3.00 |
| Integra 44 (ISP) | | 0.15 |
| Water | | Qs |

Testing of Polymers in Cleaning Formulations

The inventive polymer is combined with three separate formulations. Each formulation with polymer is compared to the formulation without polymer (control) in several standard tests.

The formulations are:

SCRUB FREE® formulation purchased commercial, a product of Church and Dwight. 0.50 wt. % polymer active is added directly to the commercially purchased formula and stirred to completely disperse or dissolve in the formulation. This formulation is acidic (pH of 1.2)

SCRUBBING BUBBLES® Aerosol formulation is purchased commercial, a product of SC Johnson. 0.50 wt. % polymer active is added directly to the commercially purchased formula and stirred to completely disperse or dissolve in the formulation. The formulation is basic (pH of 11.0) and contains surface substantive hydrophobic quaternary compounds (antibacterial agent).

Alkaline Bathroom Cleaner

| Ingredient | % Wt. |
|---|---|
| [1]Versene 100 | 8 |
| DPnP | 2 |
| Tergitol 15 S-7 | 1 |
| Water | 88.675 |
| Citric Acid | 0.325 |
| pH | 10 |

Versene 100 is tetrasodium salt of ethylenediaminetetraacetic acid.
DPnP is DOWANOL dipropylene glycol n-propyl ether. 0.5 wt. % active polymer is added directly to the alkaline bathroom cleaner to completely disperse or dissolve in the formulation.
Tergitol 15 S-7 is $C_{12}$-$C_{14}$ secondary alcohol ethoxylate with 7 moles of Ethylene oxide.

Application Testing Results

TABLE 2

Results of Application Testing

| | Scrub Free | | Scrubbing Bubbles | | Alkaline Bathroom Cleaner | |
|---|---|---|---|---|---|---|
| Example | [1]Soap Scum Repellency | [2]% Dried @ 30 Seconds | Soap Scum Repellency | % Dried @ 30 Seconds | Soap Scum Repellency | % Dried @ 30 Seconds |
| 1 | 4.75 | 98 | 4 | 99 | 2.125 | 100 |
| 2 | 2.25 | 86 | 4.25 | 83 | 1.875 | 15 |
| 3 | 4.5 | 81 | 2.25 | 65 | 3.125 | 35 |
| 4 | 5 | 96 | 5 | 96 | 2.125 | 96 |
| Control (no polymer) | 0 | 8 | 0 | 96 | 0 | 5 |

1. Soap Scum Soil. A solution of 4% potassium oleate and 0.5% sodium stearate is prepared in 300 ml de-ionized water. The solution is stirred with minimal heat until the potassium oleate is dissolved completely. 150 ml of 2.5% $CaCl_2 2H_2O$ solution in de-ionized water is then added causing a white precipitate. The mixture is stirred briefly, then 0.09 g methylene blue is added to the 450 ml solution. The solution is stirred until well mixed and filtered through a glass fritted funnel. The solid product is rinsed until the mother liquor becomes a sky blue color or approximately 3 times. The wet solid is transferred to another beaker to which is added approximately 110 ml of de-ionized water. The mixture is stirred with a mechanical stirrer until the slurry reached a uniform consistency. [The slurry solution is stored in a refrigerator when not in use.]

2 mL solution of 0.5% polymer in a cleaning formulation is placed onto a 2-inch square paper towel. The paper towel is then wiped up and down on one half of a 10 cm×10 cm white tile (Home Depot) 12 times. The untreated side is wiped with a formulation without polymer using the same application method. The tile is then air dried for 1 hour, and contact angle is measured. 0.3-0.4 g of soap scum is then applied with a paintbrush by dabbing the soil onto the tile surface using very short strokes. Tiles are air dried for one hour on bench top.

The soiled tiles are then placed under a flowing spray of de-ionized water (flow rate of 30 mL/sec) for two minutes with the tiles held at a 45 degree angle to the stream of water. The water stream is directed at the center of the tile so that the spray pattern hits both sides of the tile in equal amounts. After removing from the water stream, the tiles are air dried and visually evaluated on a scale of 0 to 5, 5 being the most effective with 0 representing virtually no soap scum repellency.

2. Drying Test Procedure. 3 mL solution of 0.5% polymer in a cleaning formulation is placed onto a 2"×5" paper towel. The paper towel is then wiped up and down on a full 10 cm×10 cm black tile (Home Depot) 12 times. The tile is air dried for 1 hour and then rinsed under a flowing spray of de-ionized water (flow rate of 30 mL/sec) for 30 seconds. Immediately after the rinsing procedure, the wet tile is kept vertical at an angle of around 65°. 30 seconds after the rinsing process, the % of the tile which is dry is estimated by visual observation and recorded.

The inventive polymer provides high soap scum repellency along with rapid drying time of vertical surfaces.

We claim:

1. A hard surface cleaner or hard surface treatment comprising a copolymer which copolymer is formed from a) a cationic monomer described by formula (I)

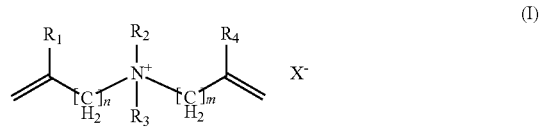

wherein: $R_1$ and $R_4$, independently of each other, represent a hydrogen atom or a linear or branched $C_1$-$C_6$ alkyl group; $R_2$ and $R_3$, independently of each other, represent an alkyl, hydroxyalkyl group wherein the alkyl group is a linear or branched $C_1$-$C_6$ chain;

n and m are integers between 1 and 3;

and $X^-$ represents a counterion;

b) an anionic monomer selected from the group of monomers consisting of $C_3$-$C_8$ carboxylic, sulfonic, sulfuric, phosphonic or phosphoric acids, anhydrides and salts thereof;

c) a substituted (meth)acrylamide described by formula (II)

$R_1$ is hydrogen or methyl,
$R_2$ is hydrogen or $C_1$-$C_2$ alkyl,

R₃ and R₄ are independently $C_1$-$C_8$ alkyl;

d) optionally, a crosslinker, and e) 0 to 30 wt. % of an additional nonionic monomer;
wherein component a) will exceed the molar amount of component b) incorporated into the copolymer by at least 10%, and the cleaner or treatment further contains a nonionic, anionic, cationic, amphoteric or zwitterionic surfactant.

2. The hard surface cleaner or hard surface treatment according to claim 1, wherein the cationic monomer of component a)
makes up at least 0.5 to 40 wt. % of the total formed copolymer.

3. The hard surface cleaner or hard surface treatment according to claim 1, wherein the anionic monomer of component b)
makes up at least 0.1 to 20 wt. % of the total polymer.

4. The hard surface cleaner or hard surface treatment according to claim 1, wherein the component c)
makes up at least 15 to 95 wt. % of the total polymer.

5. The hard surface cleaner or hard surface treatment according to claim 1, wherein the cationic monomer of component a) is selected from the group of cationic monomers consisting of diallyldimethylammonium chloride (DADMAC), diallyldimethylammonium bromide, diallydimethylammonlum sulfate, diallydimethylammonium phosphate, dimethyallydimethyammonium chloride, diethylallyldimethylammonium chloride, diallyldi(beta-hydroxyethyl)ammonium chloride and diallyldiethylammonium chloride.

6. The hard surface cleaner or hard surface treatment according to claim 1, wherein the anionic monomer of component b) is selected from the group of anionic monomers consisting of
acrylic acid, methacrylic acid, ethacrylic acid, dimethylacrylic acid, maleic acid, maleic anhydride, methylenemalonic acid, crotonic acid, fumaric acid, itaconic acid, sorbic acid, angelic acid, cinnamic acid, styrylacrylic acid, citraconic acid, glutaconic acid, aconitic acid, phenylacrylic acid, citraconic acid, vinylbenzoic acid, sulfoethylmethacrylate, sulfopropyl acrylate, styrenesulfonic acid, 2-acrylamido-2-methylpropane sulfonic acid (AMPS), ethylenesulfonic acid, vinyl sulphuric acid,
4-vinylphenyl sulphuric acid, 2-methyl-2-propene-1-sulfonic acid, 2-propene-1-sulfonic acid, ethylene phosphonic acid, vinyl phosphoric acid, divinyl phosphonic acid, allyl phosphonic acid, methallyl phosphonic acid, methacrylamidomethane phosphonic acid, 2-arylamido-2-methylpropane phosphonic acid, 3-phosphonopropyl acrylate and 3-phosphonopropyl methacrylate, preferably the anionic monomer is selected from the group consisting of acrylic acid or methacrylic acid, 2-acrylamido-2-methylpropane sulfonic acid (AMPS).

7. The hard surface cleaner or hard surface treatment according to claim 1, wherein the sum of the weight of monomers a) and b) will range from 60 to 4 weight % of the total weight of the formed copolymer.

8. The hard surface cleaner or hard surface treatment according to claim 1, wherein substituted (meth)acrylamide of component c) is selected from group consisting of N,N-dimethyl(meth)acrylamide, N,N-methylethyl(meth)acrylamide, N,N-diethyl(meth)acrylamide, N,N-methylpropyl(meth)acryalmide, N,N-ethylpropyl(meth)acrylamide, N,N-methylpropyl(meth)acrylamide, N,N-dipropyl(meth)acrylamide, N,N-methylbutyl(meth)acrylamide, N,N-ethylbutyl(meth)acrylamide, N,N-dibutyl(meth)acrylamide and N,N-propylbutyl(meth)acrylamide, N,N-dipentyl(meth)acrylamide, N,N methylpentyl(meth)acrylamide, N,N-ethylpentyl(meth)acrylamide, N,N-propylpentyl(meth)acrylamide, N,N-butylpentyl(meth)acrylamide, N,N-dihexyl(meth)acrylamide, N,N-methylhexyl(meth)acrylamide, N,N-ethylhexyl(meth)acryalmide, N,N-propylhexyl(meth)acryalmide, N,N-butylhexyl(meth)acrylamide, N,N-pentylhexyl(meth)acrylmide, N,N-diheptyl(meth)acrylamide, N,N-methylheptyl(meth)acrylamide, N,N-ethylheptyl(meth)acrylamide, N,N-propylheptyl(meth)acrylamide, N,N-butylheptyl(meth)acrylamide, N,N-pentylheptyl(meth)acrylamide, N,N-dioctyl(meth)acrylamide, N,N-methyloctyl(meth)acrylamide, N,N-ethyloctyl(meth)acrylamide, N,N-propyloctyl(meth)acrylamide, N,N-butyloctyl(meth)acrylamide, N,N-pentyloctyl(meth)acrylamide and N,N-heptyloctyl(meth)acrylamide.

9. The hard surface cleaner or hard surface treatment according to claim 1, wherein the pH of the hard surface cleaner is acidic or alkaline.

10. The hard surface cleaner according to claim 1, wherein the hard surface cleaner is in the form of a pourable or sprayable liquid, dilutable liquid, cream or paste, aerosol, liquids that are pre-applied in a wiping product, concentrate, gel, solid or dry products that must first be combined with water.

11. The hard surface cleaner or hard surface treatment according to claim 1, wherein the copolymer comprises about 0.1 to about 10 wt. % of the hard surface cleaner composition.

12. The hard surface cleaner or hard surface treatment according to claim 1, wherein the copolymer is formed from an additional nonionic monomer and the additional nonionic monomer is selected from the group consisting of
(meth)acrylamide, branched or unbranched $C_1$-$C_6$ alkyl (meth)acrylate esters and hydroxyl substituted $C_1$-$C_6$ alkyl (meth)acrylate esters, N-methylacrylamide, polyethylene glycol and polypropylene glycol esters of (meth)acrylate, vinyl acetate, vinyl pryrrolidone, 2-vinylpyridine and 4-vinylpyridine.

13. The hard surface cleaner or hard surface treatment according to claim 1, wherein the hard surface cleaner is incorporated into cleaning compositions for doing the washing up in a dishwasher or by hand, for cleaning glass panels, bathrooms, sinks, motor vehicle bodyworks, shower walls, toilet pans and glass-ceramic plates.

14. A method for reducing the drying time of a liquid cleaning composition comprising the steps
applying the cleaning composition to a hard surface,
which cleaning composition comprises an efficient amount of the copolymer according to claim 1.

15. The method according to claim 14, wherein the cleaning composition is formulated into an automatic or hand dishwashing composition.

16. The hard surface cleaner or hard surface treatment according to claim 1, wherein the component c) will be at least 50 weight % of the total copolymer.

17. The hard surface cleaner or hard surface treatment according to claim 1, wherein the net charge of the copolymer ranges from about 0.0 to about 1.5 meq/g.

18. The hard surface cleaner or hard surface treatment according to claim 16, wherein the component a) makes up at least 5 to 25 wt. % of the copolymer.

* * * * *